US010541895B2

(12) United States Patent
Sage et al.

(10) Patent No.: US 10,541,895 B2
(45) Date of Patent: Jan. 21, 2020

(54) APPARATUS AND METHOD FOR DETERMINING KEY PERFORMANCE INDICATORS

(71) Applicant: General Electric Company, Schenectady, NY (US)

(72) Inventors: Peter Sage, Stephentown, NY (US); Ashish Raisardar, Dublin, CA (US)

(73) Assignee: General Electric Company, Schenectady, NY (US)

( * ) Notice: Subject to any disclaimer, the term of this patent is extended or adjusted under 35 U.S.C. 154(b) by 619 days.

(21) Appl. No.: 15/292,882

(22) Filed: Oct. 13, 2016

(65) Prior Publication Data

US 2018/0107737 A1 Apr. 19, 2018

(51) Int. Cl.
*H04L 12/26* (2006.01)
*G06F 16/2458* (2019.01)
*H04L 29/08* (2006.01)

(52) U.S. Cl.
CPC ...... *H04L 43/0805* (2013.01); *G06F 16/2471* (2019.01); *H04L 67/10* (2013.01)

(58) Field of Classification Search
CPC ..... H04L 43/0805; H04L 67/10; H04L 67/12; G06F 16/11; G06F 16/2471; G05B 19/4185; G05B 23/0272
See application file for complete search history.

(56) References Cited

U.S. PATENT DOCUMENTS 6,587,857 B1\* 7/2003 Carothers ............. G06F 16/283
707/602
2007/0156880 A1\* 7/2007 Kim .................... H04L 41/0213
709/223
2013/0054523 A1\* 2/2013 Anglin .................... G06F 16/27
707/624
2014/0320500 A1\* 10/2014 Fletcher ................ G06T 11/206
345/440
2015/0213631 A1\* 7/2015 Vander Broek ..... G06F 16/2477
345/589
2016/0004733 A1\* 1/2016 Cao ..................... G06F 11/0709
707/755
2019/0129578 A1\* 5/2019 Fletcher ............. G06F 9/45533

OTHER PUBLICATIONS

Mattos, "System and Method for a Simple Network Management Protocol Downtime Calculator", U.S. Appl. No. 13/238,372, Department of the Navy, Sep. 21, 2011. (Year: 2011).\*

\* cited by examiner

*Primary Examiner* — Jay A Morrison
(74) *Attorney, Agent, or Firm* — Fitch Even Tabin & Flannery LLP

(57) ABSTRACT

A data processing apparatus is deployed at a cloud network, and includes a plurality of data nodes, a receiver circuit, and an aggregation circuit. The receiver circuit is coupled to the plurality of data nodes and is configured to receive downtime records from a plurality of industrial machines, and to selectively route the downtime records to selected ones of the plurality of data nodes based upon a predetermined criteria. Each of the plurality of data nodes comprises a control circuit and a memory. Each control circuit is configured to, in parallel with the other control circuits, to further populate the downtime records with other data related to the operation of the machines, determine one or more time windows for each of the records, and divide the records according to the time windows.

18 Claims, 7 Drawing Sheets

DOWNTIME RECORD (340)

| WORK ORDER | PRODUCT A |
|---|---|
| SHIFT | SHIFT 1 |
| OPERATOR | GEORGE |
| SCHEDULE | IN PRODUCTION |
| DATE | 7/13/2016 |
| DOWNTIME | 30 MINUTES |

*FIG. 5A*

DOWNTIME RECORD (342)

| WORK ORDER | PRODUCT A |
|---|---|
| SHIFT | SHIFT 1 |
| OPERATOR | GEORGE |
| SCHEDULE | IN PRODUCTION |
| DATE | 7/13/2016 |
| DOWNTIME | 13 MINUTES |

| WORK ORDER | PRODUCT A |
|---|---|
| SHIFT | SHIFT 1 |
| OPERATOR | SUE |
| SCHEDULE | IN PRODUCTION |
| DATE | 7/13/2016 |
| DOWNTIME | 17 MINUTES |

*FIG. 5B*

DOWNTIME RECORD (344)

| WORK ORDER | PRODUCT B |
|---|---|
| SHIFT | SHIFT 1 |
| OPERATOR | SUE |
| SCHEDULE | IN PRODUCTION |
| DATE | 7/13/2016 |
| DOWNTIME | 10 MINUTES |

| WORK ORDER | PRODUCT B |
|---|---|
| SHIFT | SHIFT 2 |
| OPERATOR | AMANDA |
| SCHEDULE | IN PRODUCTION |
| DATE | 7/13/2016 |
| DOWNTIME | 30 MINUTES |

*FIG. 5C*

| WORK ORDER | PRODUCT C |
|---|---|
| SHIFT | SHIFT 2 |
| OPERATOR | AMANDA |
| SCHEDULE | IN PRODUCTION |
| DATE | 7/14/2016 |
| DOWNTIME | 2 MINUTES |

| WORK ORDER | NONE |
|---|---|
| SHIFT | SHIFT 2 |
| OPERATOR | AMANDA |
| SCHEDULE | IN PRODUCTION |
| DATE | 7/14/2016 |
| DOWNTIME | 2 MINUTES |

| WORK ORDER | NONE |
|---|---|
| SHIFT | SHIFT 2 |
| OPERATOR | AMANDA |
| SCHEDULE | NO PRODUCTION |
| DATE | 7/14/2016 |
| DOWNTIME | 36 MINUTES |

DOWNTIME RECORD
(346)

*FIG. 5D*

APPARATUS AND METHOD FOR DETERMINING KEY PERFORMANCE INDICATORS

BACKGROUND OF THE INVENTION

Field of the Invention

The subject matter disclosed herein generally relates to determining key performance indicators for machines, groups of machines, or manufacturing lines.

Brief Description of the Related Art

Various types of industrial machines are used to perform various manufacturing operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Industrial machines often operate together in plants or factories.

High volume, highly automated manufacturing processes or lines also exist. For instance, processes exist to manufacture paper towels, diapers, or bottling soda to mention a few examples. The machines used in these processes do not stand alone, but are part of the entire manufacturing operation. For example, a conveyer moves empty bottles into a filler, where they are filled, then the bottles flow into a capper, where a cap is applied, then into a packager where they are placed into boxes and finally into a palletizer.

Key performance indicators describe the operation of machines (either standing alone or organized into groups or manufacturing lines). For example, the efficiency, yield, and availability of the machines (or lines) describe how well the machines (or lines) are operating.

These indicators can be used to improve the operation of the machines or manufacturing lines. For instance, when an assembly line (with multiple machines) is not operating efficiently or has an unacceptable yield the operation of the machines or line can be changed to improve the efficiency of the machine or line.

Various types of data may be used to obtain the indicators. For example, data from individual machines may be utilized. Other types of information that relates to when different events occur in the plant (e.g., when a production order starts on a line, when a crew is assigned to a shift start work, or when the line is scheduled to be in production to mention a few examples) can also be used.

Unfortunately, there are huge amounts of data that needs to be considered. Analyzing huge amounts of data takes time, and in current systems processing large amounts of data significantly slows the analysis process.

Previous attempts to address these problems have been made, but unfortunately, have not been successful.

BRIEF DESCRIPTION OF THE INVENTION

The present invention is directed to providing data optimizations and visualizations across an enterprise of plants located (potentially) across the globe. More specifically, key performance indicators may be quickly and efficiently obtained across an entire enterprise of plants, machines, or manufacturing lines. In some embodiments, the invention described herein may be implemented at the cloud and may be applied on a global basis across numerous plants, locations, and/or industrial machines separated by great distances. One feature of this invention is the ability to perform time window data slicing of vast amounts of data sets over multiple processors that are operating simultaneously and in parallel. This enables a vast amount of data to be analyzed and results returned for consideration in an acceptable amount of time. The invention herein may optionally be implemented using a computerized industrial internet of things analytics platform that may be deployed at the cloud.

In many of these embodiments, a data processing apparatus is deployed at a cloud network, and includes a plurality of data nodes, a receiver circuit, and an aggregation circuit. The receiver circuit is coupled to the plurality of data nodes and is configured to receive downtime records from a plurality of industrial machines, and to selectively route the downtime records to selected ones of the plurality of data nodes based upon a predetermined criteria. Each of the plurality of data nodes comprises a control circuit and a memory. The memory is coupled to the control circuit, and stores selected ones of the downtime records. It will be appreciated that other types of data (besides downtime data) can be used in these approaches such as quality data, production data, waste data, rate loss data and genealogy data. Other examples are possible.

The aggregation circuit is coupled to the plurality of nodes. Each control circuit is configured to (in parallel with the other control circuits) further populate the downtime records with other data related to the operation of the machines or manufacturing lines, to determine one or more time windows for each of the records, and to divide or partition the records according to the time windows. A query is received and forwarded to each of the plurality of data nodes. The query relates to a performance indicator associated with one or more of the plurality of industrial machines. In response to the query, each control circuit of each data node (in parallel with the other control circuits at the other nodes) selectively examines downtime records in the memory at each node according to the time windows, and forms an answer to the query. The memory may be a temporary memory, a permanent memory (e.g., disk), or combinations thereof. Each of the answers from the nodes is aggregated by the aggregation circuit to form an answer to the query.

In aspects, additional downtime records are accepted by the receiver circuit without decreasing the speed of the apparatus. In other examples, the machines are deployed in a plurality of different manufacturing plants or locations.

In yet other examples, the apparatus includes a user interface, and the user interface accepts the query from a user. In some examples, the user interface also presents the answer to the user.

In aspects, the other types of information includes information concerning a product produced by the machine, the operator of the machine, a work shift associated with the machine, an equipment schedule, or a calendar date. Other examples are possible.

In examples, the downtime records include a machine identifier that uniquely identifies the machine and the predetermined criteria is the identifier. Other examples are possible.

In some aspects, the downtime records are duplicated at multiple nodes. In examples, the query relates to an efficiency, a yield, or an availability of a machine or group of machines. Other examples are possible. The query results can be aggregated from/across units, lines, areas, plants, and business units to mention a few examples.

BRIEF DESCRIPTION OF THE DRAWINGS

For a more complete understanding of the disclosure, reference should be made to the following detailed description and accompanying drawings wherein:

FIGS. 5A-5D comprise examples of downtime records according to various embodiments of the present invention;

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches advantageously obtain key performance indicator information quickly and efficiently across an entire enterprise of plants (or across multiple machines). The approaches described herein may be implemented at the cloud (e.g., by the Predix™ platform available from General Electric Company) and may be applied on a global basis across numerous plants, locations, and/or industrial machines located at great distances such as worldwide.

Figure 1:
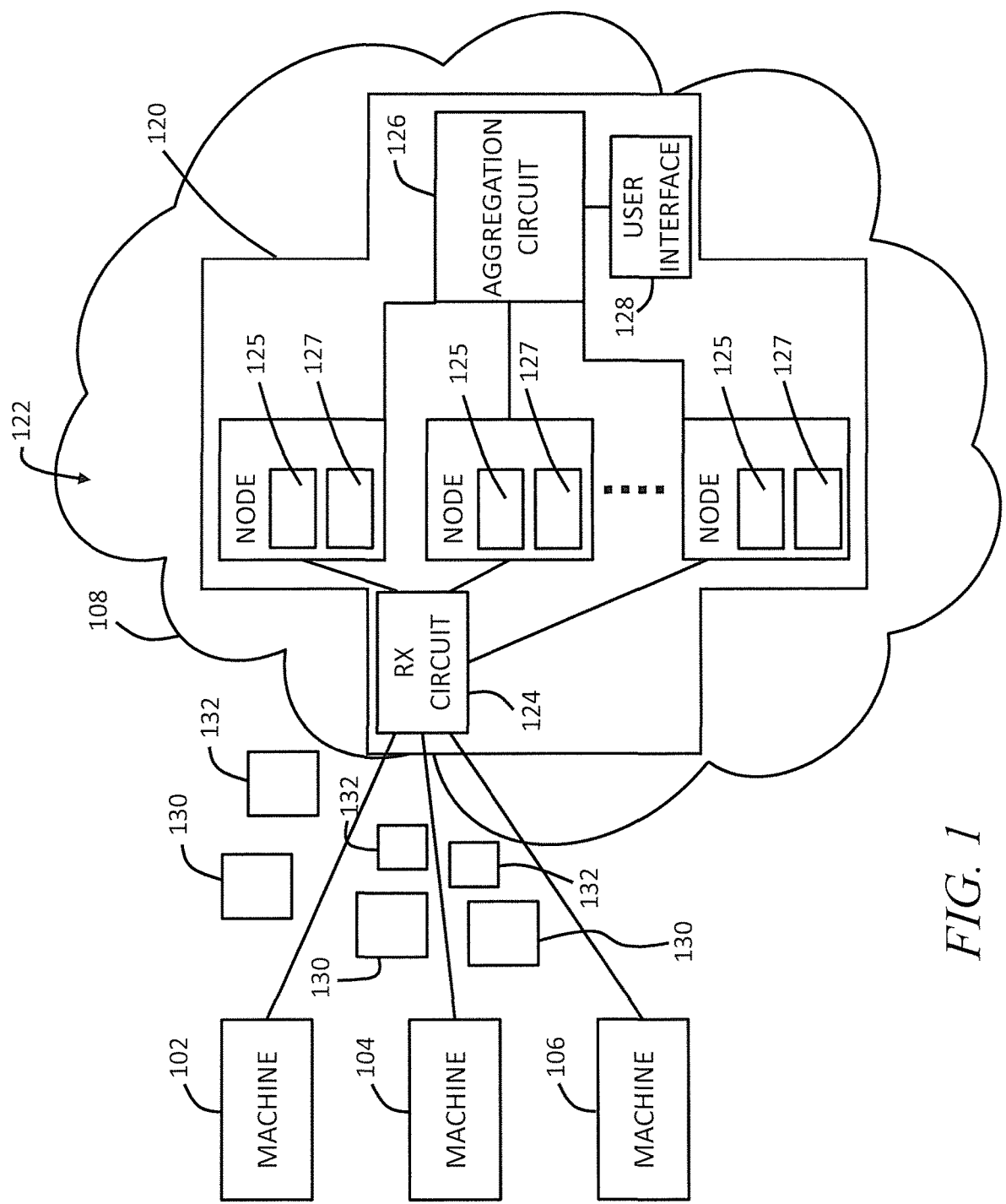
FIG. 1 comprises a block diagram of a system for determining a key performance indicator (or other information) according to various embodiments of the present invention.

Referring now to FIG. 1, one example of a system that processes downtime records in parallel includes machines 102, 104, and 106, and a cloud 108. Within the cloud 108 is a data center 120. The data center 120 includes a plurality of nodes 122, a receiver circuit 124, an aggregation circuit 126, and a user interface 128.

Machines 102, 104, and 106 may be located at a single manufacturing site, factory, or plant. Although many of the examples described herein show the machines as being at a single plant, it will be appreciated that the machines may be disposed at multiple facilities located at multiple geographic locations. These geographic locations may be separated at great distances. To take one example, the plants may be disposed across the world. Some of the factories may be on one continent, while others may be located at another continent.

The machines 102, 104, and 106 are any type of industrial machine. For example, some of the machines 102, 104 and 106 may be used to create and finish parts associated with wind turbines. Other machines are used to create mechanical parts or components utilized by vehicles. Still other machines are used to produce electrical parts (e.g., resistors, capacitors, and inductors to mention a few examples). A machine may also be a wind turbine itself or a component of a wind turbine. Many other examples of machines are possible.

The cloud 108 is a computer network that includes various routing, data storage, and processing devices. The data center 120 is disposed at the cloud 108 and includes the nodes 122. Each node includes a control circuit 125 and a memory 127. The memory 127 may be a temporary memory, a permanent memory (e.g., disk), or combinations thereof.

The receiver circuit 124 receives downtime records 130 from the machines 102, 104, and 106, and routes the records to the appropriate node. In one example, each record 130 identifies a machine 102, 104, or 106. A separate one of the nodes 122 is used to store downtime records 130 for a particular machine 102, 104, or 106. Consequently, the receiver circuit 124 routes a particular record 130 to the appropriate one of the nodes 122 based upon a machine identifier field in the record 130. In this example, only three nodes are shown. However, it will be appreciated that any number of nodes may be disposed at the data center 120. Additionally, the receiver circuit 124 may be implemented as any combination of hardware and/or software. For example, the receiver circuit 124 may include a microprocessor that executes computer instructions stored in memory. Furthermore, the receiver circuit 124 may receiver other information 132 (concerning the operation of a machine) and route this information to an appropriate one of the nodes 122.

The aggregation circuit 126 obtains answers from each of the nodes 122 after it forwards a query to the nodes 122. For example, a query might ask the efficiency of a particular operator or the efficiency of a product line. The aggregation circuit 126 takes the individual answers it receives from the individual nodes 122 and forms an answer. For example, it may look at the efficiency of a particular operator at each node, sum the efficiencies, and divide by the number of nodes to form an answer. As with the receiver circuit 124, the aggregation circuit 126 may be implemented as any combination of hardware and/or software. For example, the aggregation circuit 126 may include a microprocessor that executes computer instructions stored in memory.

The user interface 128 is any interface device that allows a user to enter a query. In aspects, the user may enter a query concerning a key performance indicator. The key performance indicator relates to the performance of a machine, a group of machines, a plant, a group of plants, or an operator, to mention a few examples. More specifically, the key performance indicators may relate to efficiency, availability, or yields to mention a few examples. Other examples are possible. In examples, the user interface 128 may be a smart device (e.g., cellular phone), or a personal computer and include an entry device (e.g., a touchscreen) and/or a display.

In one example of the operation of the system of FIG. 1, the downtime records 130 are received at a receiver circuit 124. The downtime records 130 include information concerning the downtime of a machine (e.g., length of downtime), and may be organized as any type of data structure such as a record or file. The downtime records 130 are routed to an appropriate node (or nodes) within the plurality of nodes 122 by the receiver circuit 124. The routing may be according to a predetermined criteria. For example, each of the nodes 122 may store records for a specific machine. It will be appreciated that other types of data (besides downtime data records) can be used in these approaches such as quality data records, production data records, waste data records, rate loss data records and genealogy data records. Other examples are possible.

Other records 132 include other information concerning the downtime of the machine. For example, the other records 132 may be information concerning the product being made by a machine over time, the shift using the machine, the crew or operator at the machine, the equipment schedule (whether the machine is in production or not) and the calendar date. The other records 132 may be organized as any type of data structure such as a record or file. Information in the records 132 may alternatively be already included in the downtime records 130 so that the other records 132 are not needed. The downtime records 130 and other data records 132 are stored in each memory 127.

At the node, this information is used by each control circuit 125 to populate and/or time slice the record 130 into different time windows. These operations occur in parallel at all nodes 122 at the same time (or approximately the same time). To give one specific example and for a first downtime record, it may be determined that Product A was created, during shift 1, with George as the operator, when the line was in production, and this occurred on 7/13/2-2016. One time window is needed and the record does not need to be sliced further.

For a second downtime record 130, it may be determined that Product A was created, during shift 1, when the line was in production, on 7/13/2-2016. However, for 13 minutes George was the operator and for 17 minutes Sue was the operator. Because the downtime occurred with two operators, the downtime record 130 is modified or transformed to indicate this split. Thus, the downtime record is effectively divided into two sub-records, one with George as the operator and one with Sue as the operator. As mentioned, the processing and slicing of records 130 occurs in parallel across all nodes. The downtime records may be divided by the time windows according to any data format or structure. For example, each downtime record 130 may be divided into sub-records with each sub-record corresponding to a time window.

A query is then asked (from an operator at the user interface 128) and this query may be routed to all nodes (or selected nodes) by the aggregator circuit 126. For instance, the query may be "How much downtime has George?" Each control circuit 125 at each node examines its records 130 at its memory 127 and answers the question. The answer is sent to the aggregation circuit 126. The aggregation circuit 126 receives various answers from each of the nodes. The aggregation circuit 126 processes all the answers (e.g., George has 0 downtime on one machine, but 30 minutes on node 10) and analyzes this information. For example, (knowing each node represents a machine) the aggregation circuit 126 can ascertain that George does not need training on one machine, but needs training on another machine.

Queries may also me made automatically, without being initiated by a user. For example, the efficiency of a particular operator may be checked on a periodic (e.g., daily) basis with this check being made automatically each day.

Figure 2:
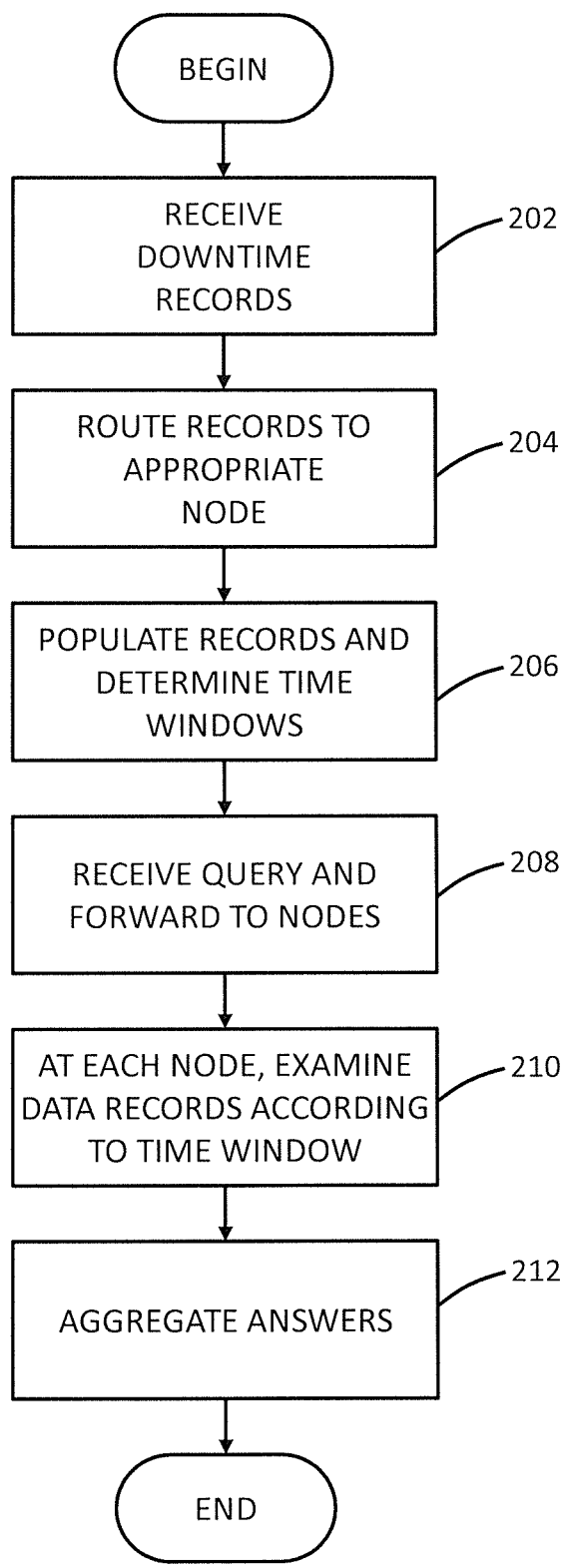
FIG. 2 comprises a flowchart of one approach for determining a key performance indicator (or other information) according to various embodiments of the present invention.

Referring now to FIG. 2, one example of an approach for determining a key performance indicator is described. At step 202, downtime records are received from a plurality of industrial machines at a receiver circuit of the data processing apparatus. At step 204, the downtime records are routed to selected ones of a plurality of data nodes of the data processing apparatus based upon a predetermined criteria. Each of the plurality of data nodes comprises a control circuit and a memory. The memory at each node stores selected ones of the downtime records. Additionally, the downtime records may be duplicated at various nodes to provide data redundancy.

At step 206, at each control circuit and in parallel with all the other control circuits, the downtime records are further populated with other data related to the operation of the machines, and a determination is made as to one or more time windows for each of the records. However, in some examples the downtime records are already populated with the other data. Dividing the records into time windows allows faster processing of the records.

At step 208, a query is received and forwarded to each of the plurality of data nodes. The query relates to a performance indicator associated with one or more of the plurality of industrial machines.

At step 210, responsive to receiving the query and at each control circuit of each data node, the downtime records stored in the memory of each node are selectively examined according to the time windows. An answer to the query is formed at each node. Step 210 is performed in parallel with the other control circuits at the other nodes.

At step 212, and at an aggregation circuit, each of the answers from each of the individual nodes is aggregated to form a final answer to the query. The final answer may be presented to a user, for example, on a screen.

Figure 3:
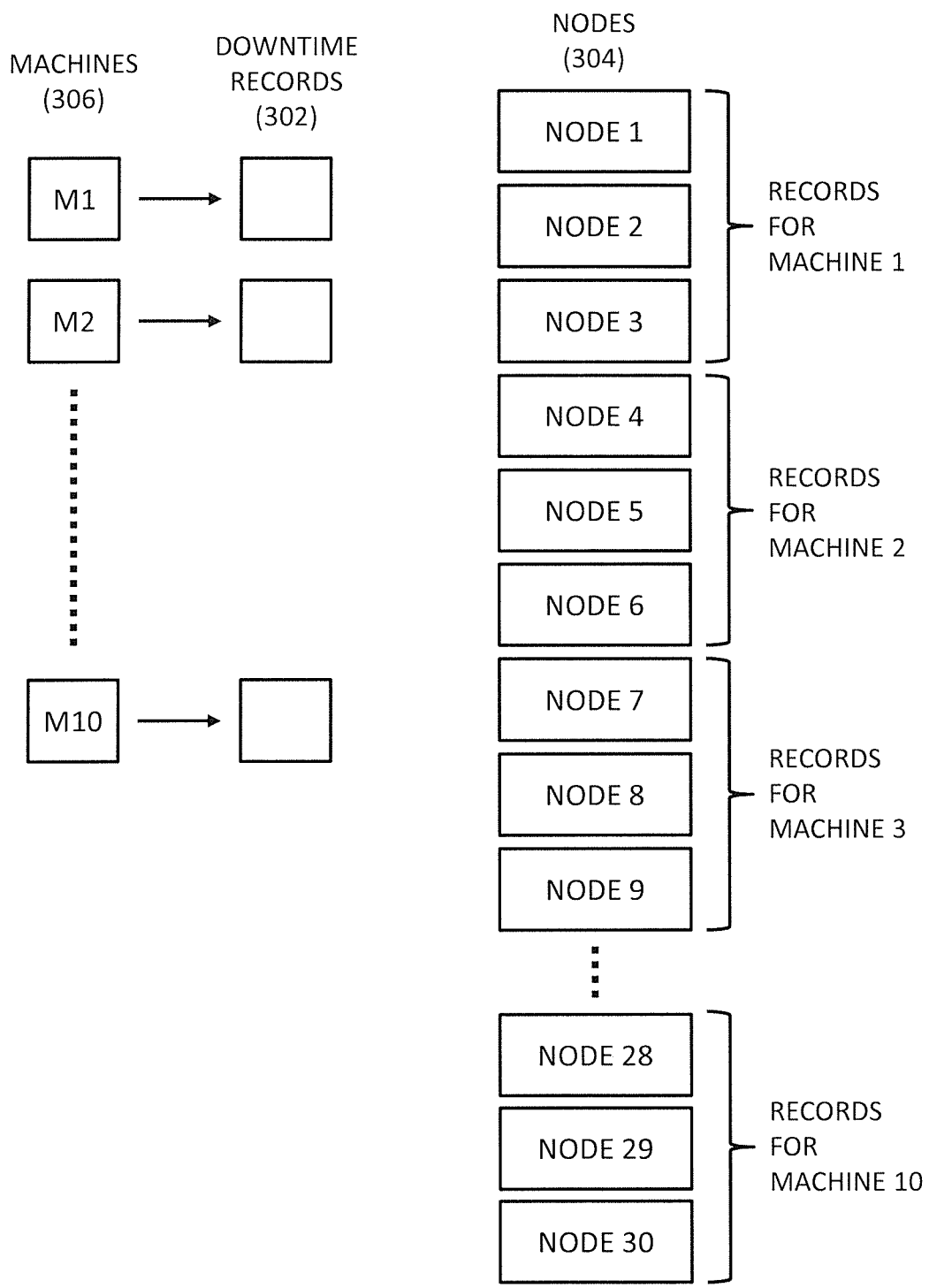
FIG. 3 comprises a block diagram of a system for determining a key performance indicator (or other information) according to various embodiments of the present invention.
Figure 4:
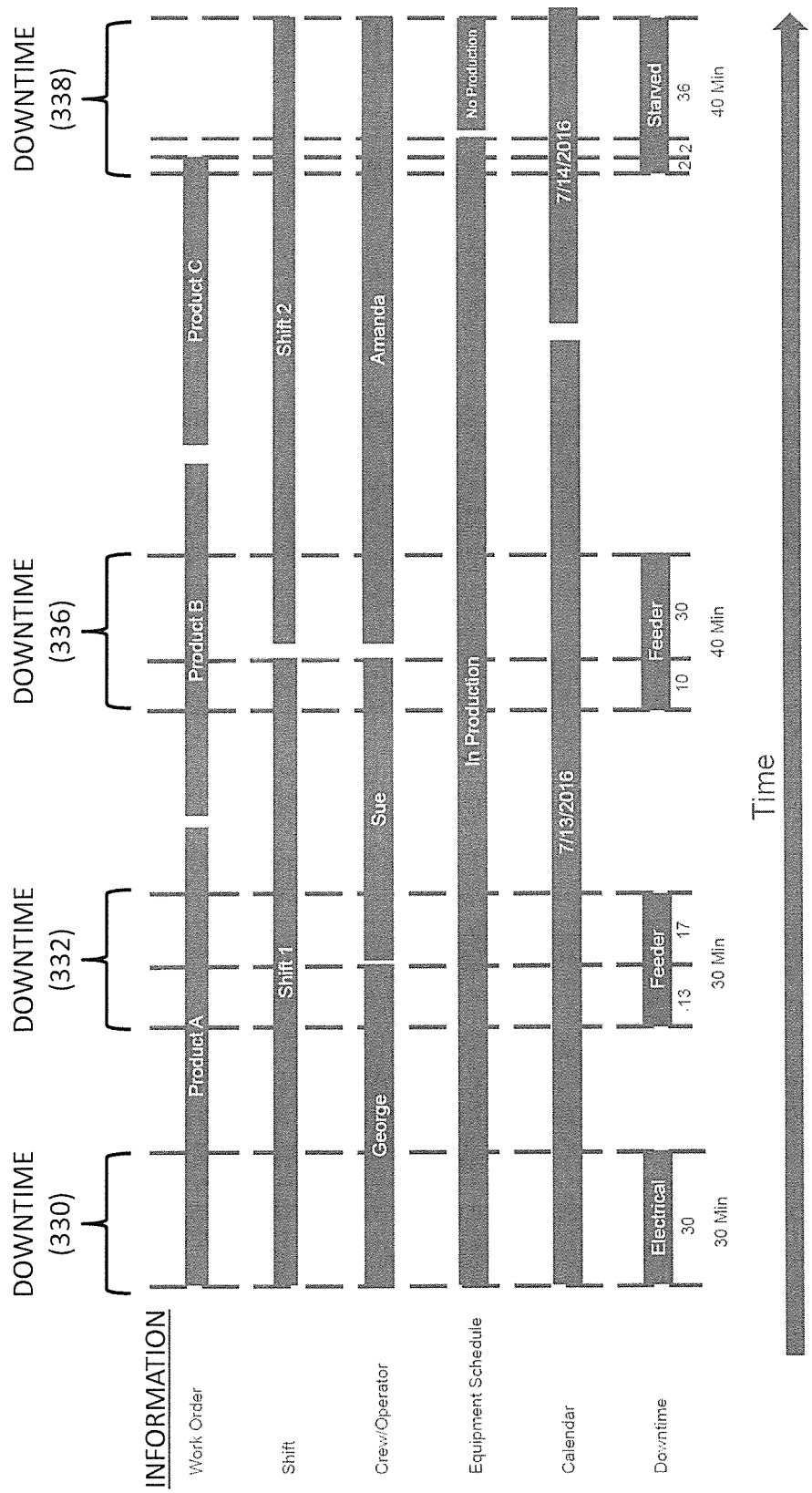
FIG. 4 comprises a graph showing information concerning downtimes of a machine according to various embodiments of the present invention.

Referring now to FIG. 3, FIG. 4, and FIG. 5, an example of how "time slicing" is used to divide downtime records at a data center into multiple portions is described. In this example, downtime records 302 are received from machines 304 and routed to various nodes 306. There are 10 machines 304. The records 302 are routed to one of thirty nodes. The nodes 306 are partitioned into groups, and each node in a group stores records for a particular machine. Also, the records are duplicated so that three copies of each records exist. Consequently, three nodes are needed for each machine. The records are either populated at the node with additional information concerning the downtime event, or include that information in the downtime record when received at the data center.

There are ten industrial machines (M1-M10). In this example, nodes 1-3 store records for machine 1. Nodes 4-6 store records for machine 2. Nodes 7-9 store records for machine 3, and so forth.

Examining nodes 1-3 (for the first machine M1) and for a first downtime 330, it may be determined by analyzing all information concerning the downtime that during this downtime 330, Product A was created, at shift 1, with George as the operator, the line was in production, and the downtime event occurred on 7/13/2-2016. An example downtime record 340 (modified and transformed from an initial state to include all data associated with a down time and showing one time window) is shown in FIG. 5.

During a second downtime 332, it may be determined by analyzing all information concerning the downtime that Product A was created, at shift 1, when the line was in production, on 7/13/2-2016. However, for 13 minutes George was the operator and for 17 minutes Sue was the operator. The downtime record is modified to indicate this split. Thus, the downtime record is two sub-records, one with George as the operator and one with Sue as the operator. An example downtime record 342 (modified and transformed from an initial state to include all data associated with a down time and showing two time windows) is shown in FIG. 5.

During a third downtime 334, it may be determined by analyzing all information concerning the downtime that Product B was created, at when the line was in production, on 7/13/2-2016. However, for 10 minutes shift 1 was active with Sue as the operator, while for 30 minutes shift 2 was ongoing, and Amanda was the operator. The downtime record is modified to indicate this split. Thus, the downtime record is two sub-records, one with Sue and shift 1, and the other for Amanda and shift 2. An example downtime record 344 (modified and transformed from an initial state to include all data associated with a down time and showing two time windows) is shown in FIG. 5.

During a fourth downtime 336, shift 2 was occurring, and the calendar date was Jul. 14, 2016. However, for 2 minutes, product C was scheduled. For two more minutes, production was scheduled, but nothing was being made. For 36 minutes, no production was occurring, but none was scheduled. Thus, this downtime record is divided into three portions (a first for product C in production, a second for no product, but production scheduled, and a third for no product and no production scheduled). As mentioned, the slicing of records into portions according to time windows occurs in parallel across all nodes. An example downtime record 346 (modified and transformed from an initial state to include all data associated with a down time and showing three time windows) is shown in FIG. 5. It will also be appreciated that the time slicing of the records into different portions may be a physical and/or logical partitioning.

A question or query is then asked and this may be routed to all nodes 304 (or selected nodes). For instance, the question may be "How much downtime has George?" Each control circuit at each node looks at its records and answers the question. This is sent to the aggregation circuit. For example, the aggregation circuit may receive various answers from each of the 30 nodes 304. The aggregation circuit aggregates all the answers (e.g., George has 0 downtime on machines 1-9, but 30 minutes on node 10) and analyzes this information. For example, (knowing each node represents a machine) the aggregation circuit can ascertain that George does not need training on machines 1-9, but needs training on machine 10. This recommendation may also be presented to the user in answer to the query of the user.

A wide variety of questions or queries may be asked. For example, "How much downtime has shift 1 versus shift 2?" and "How much downtime has product A versus product B?" may be asked. Other examples are possible. The question or query may be asked in any format. The system includes functionality to parse the questions and queries so that it can act on questions or queries. Additionally, data aggregation can occur over plants. For example, a query may be "Which of the factories is most efficient?" Consequently, the aggregation circuit can analyze a wide variety of information and this information may be spread over multiple machines across multiple locations.

Figure 6:
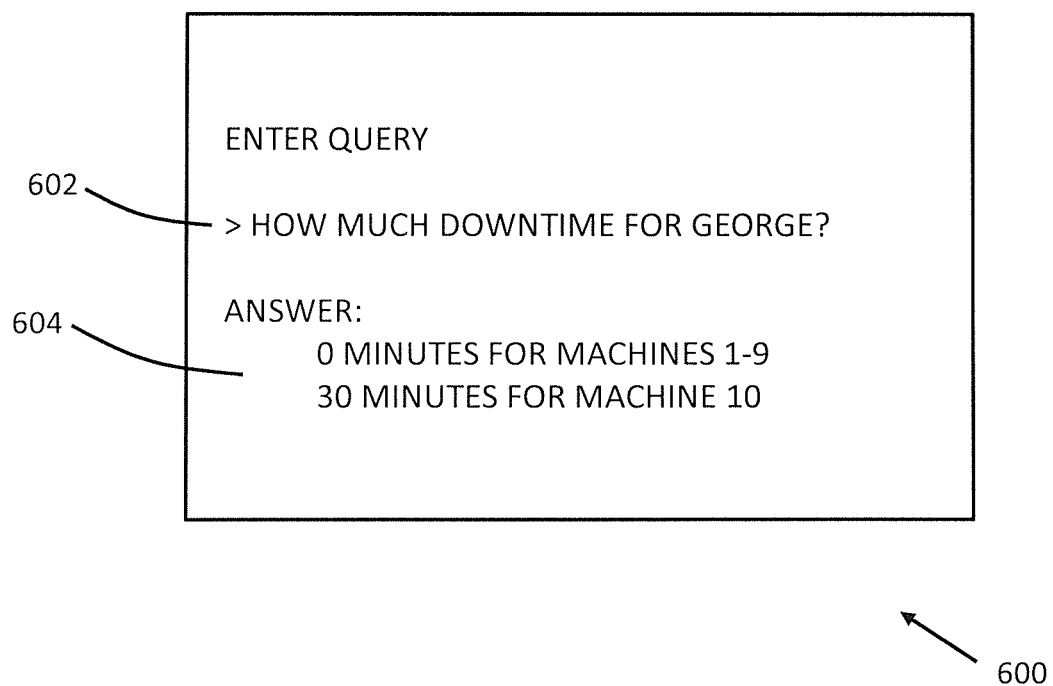
FIG. 6 comprises an example of a user interface according to various embodiments of the present invention.

Referring now to FIG. 6, one example of a user interface 600 is described. The user interface 600 may be implemented at the cloud, or at some other location such as a smart electronics device carried by a user. In one example, the user enters a query: "How much downtime for George?" Using the approaches described herein, the answer 604 is determined: "0 minutes for machines 1-9; 30 minutes for machine 10." The answer may also have a recommendation such as "George should schedule training concerning machine 10."

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A data processing apparatus deployed at a cloud network, the apparatus comprising:
a plurality of data nodes;
a receiver circuit coupled to the plurality of data nodes and configured to receive downtime records from a plurality of industrial machines, and to selectively route the downtime records to selected ones of the plurality of data nodes based upon a predetermined criteria;
wherein each of the plurality of data nodes comprises:
a control circuit; and
a memory coupled to the control circuit, the memory storing selected one of the downtime records;
an aggregation circuit coupled to the plurality of data nodes;
wherein each control circuit is configured to, in parallel with the other control circuits, further populate the downtime records with other data related to the operation of the machines, to determine one or more time windows for each of the records, and to divide the downtime records according to the time windows, wherein the downtime records include a first data record covering events in a first overall time window, wherein the first data record is physically split at a first data node into a first sub-record and a second sub-record, the first sub-record corresponding to a first time window and the second sub-record corresponding to a second time window, wherein the first time window and the second time window collectively cover events in the first overall time window associated with the first data record;
wherein the downtime records also include a second data record covering events in a second overall time window, wherein the second data record is physically split at a second data node into a third sub-record and a fourth sub-record, the third data sub-record corresponding to a third time window and the fourth sub-record corresponding to a fourth time window, wherein the third time window and the fourth time window collectively cover events in the second overall time window associated with the second data record, and wherein the splitting of the first data record at the first data node and the second data record at the second data node occurs in parallel;
wherein a query is received and forwarded to the each of the plurality of data nodes, wherein the query relates to a performance indicator associated with one or more of the plurality of industrial machines;
wherein in response to the query, each control circuit of each data node, in parallel with the other control circuits of others of the plurality of data nodes, selectively examines the downtime records in the memory at each data node according to the time windows, and forms an answer to the query;
wherein each of the answers from the data nodes is aggregated by the aggregation circuit to form a final answer to the query.

2. The apparatus of claim 1, wherein additional downtime records are accepted by the receiver circuit without decreasing the speed of the apparatus.

3. The apparatus of claim 1, wherein the machines are deployed in a plurality of different manufacturing plants or locations.

4. The apparatus of claim 1, further comprising a user interface, the user interface accepting the query from a user.

5. The apparatus of claim 4, wherein the user interface presents the final answer to the user.

6. The apparatus of claim 1, wherein the other data includes information concerning a product produced by the machine, the operator of the machine, a work shift associated with the machine, an equipment schedule, or a calendar date.

7. The apparatus of claim 1, wherein the downtime records include a machine identifier that uniquely identifies the machine and the predetermined criteria is the identifier.

8. The apparatus of claim 1, wherein the downtime records are duplicated at multiple data nodes.

9. The apparatus of claim 1, wherein the query relates to an efficiency, a yield, or an availability of one or more machines.

10. A method of answering a query at a data processing apparatus that is deployed at a cloud network, the method comprising:
receiving downtime records from a plurality of industrial machines at a receiver circuit of the data processing apparatus;
selectively routing the downtime records to selected ones of a plurality of data nodes of the data processing apparatus based upon a predetermined criteria, wherein each of the plurality of data nodes comprises a control circuit and a memory, the memory storing selected one of the downtime records;
at each control circuit and in parallel with the other control circuits, further populating the downtime records with other data related to the operation of the machines, determining one or more time windows for each of the records, and dividing the downtime records according to the time windows, wherein the downtime records include a first data record covering events in a first overall time window, wherein the first data record is physically split at a first data node into a first sub-record and a second sub-record, the first data sub-record corresponding to a first time window and the second sub-record corresponding to a second time window, wherein the first time window and the second time window collectively cover events in the first overall time window associated with the first data record;
wherein the downtime records also include a second data record covering events in a second overall time window, wherein the second data record is physically split at a second data node into a third sub-record and a fourth sub-record, the third data sub-record corresponding to a third time window and the fourth sub-record corresponding to a fourth time window, wherein the third time window and the fourth time window collectively cover events in the second overall time window associated with the second data record, and wherein the splitting of the first data record at the first data node and the second data record at the second data node occurs in parallel;
receiving a query and forwarding the query to the each of the plurality of data nodes, wherein the query relates to a performance indicator associated with one or more of the plurality of industrial machines;
responsive to receiving the query and at each control circuit of each data node, selectively examining the downtime records stored in the memory of each data node according to the time windows, and forming an answer to the query in parallel with the other control circuits at others of the plurality of data nodes;
at an aggregation circuit, aggregating each of the answers from the data nodes to form a final answer to the query.

11. The method of claim 10, further comprising accepting additional downtime records at the receiver circuit without decreasing the speed of the apparatus.

12. The method of claim 10, wherein the machines are deployed in a plurality of different manufacturing plants or locations.

13. The method of claim 10, further comprising accepting the query from the user at a user interface.

14. The method of claim 13, further comprising presenting the final answer to the user at the user interface.

15. The method of claim 10, wherein the other data includes information concerning a product produced by the machine, the operator of the machine, a work shift associated with the machine, an equipment schedule, or a calendar date.

16. The method of claim 10, wherein the downtime records include a machine identifier that uniquely identifies the machine and the predetermined criteria is the identifier.

17. The method of claim 10, further comprising duplicating the downtime records to be stored at multiple data nodes.

18. The method of claim 10, wherein the query relates to an efficiency, a yield, or an availability of one or more machines.

* * * * *